US009256412B2

(12) United States Patent
Genevski et al.

(10) Patent No.: US 9,256,412 B2
(45) Date of Patent: Feb. 9, 2016

(54) SCHEDULED AND QUARANTINED SOFTWARE DEPLOYMENT BASED ON DEPENDENCY ANALYSIS

(75) Inventors: Pavel Genevski, Sofia (BG); Georgi Pavlov, Sofia (BG)

(73) Assignee: SAP SE, Walldorf (DE)

( * ) Notice: Subject to any disclaimer, the term of this patent is extended or adjusted under 35 U.S.C. 154(b) by 290 days.

(21) Appl. No.: 13/541,698

(22) Filed: Jul. 4, 2012

(65) Prior Publication Data

US 2014/0013315 A1   Jan. 9, 2014

(51) Int. Cl.
  *G06F 9/44*   (2006.01)
  *G06F 9/445*   (2006.01)

(52) U.S. Cl.
  CPC ....................... *G06F 8/60* (2013.01)

(58) Field of Classification Search
  CPC .......... G06F 8/65; G06F 8/68; G06F 11/1433
  USPC ................................. 717/170–174
  See application file for complete search history.

(56) References Cited

U.S. PATENT DOCUMENTS

| | | | |
|---|---|---|---|
| 7,155,462 B1 * | 12/2006 | Singh et al. ................... | 717/170 |
| 2006/0101457 A1 * | 5/2006 | Zweifel et al. ................ | 717/174 |
| 2008/0141240 A1 * | 6/2008 | Uthe ............................. | 717/174 |
| 2010/0330971 A1 * | 12/2010 | Selitser et al. ................ | 455/418 |
| 2011/0231552 A1 * | 9/2011 | Carter et al. .................. | 709/226 |
| 2013/0067448 A1 * | 3/2013 | Sannidhanam et al. ...... | 717/169 |
| 2013/0283252 A1 * | 10/2013 | Mannarswamy et al. .... | 717/168 |

OTHER PUBLICATIONS

Google Developers; Google App Engine; Traffic Splitting; published on-line Jun. 26, 2012 by Google Inc.; CA; USA; 3 pages (https://developers.google.com/appengine/docs/adminconsole/trafficsplitting).

* cited by examiner

*Primary Examiner* — Duy Khuong Nguyen

(57) ABSTRACT

A request to deploy a next version of a software component in a cloud environment is received. An analysis of a number of dependencies among software components of the cloud environment is received. Deployment of the next version of the component is scheduled based on the analysis. The next version of the software component is deployed in the cloud environment in accordance with the scheduled deployment. The next version of the software component is quarantined until a predefined criteria is satisfied. In one aspect, the predefined criteria is defined based on error rate of the next version of the software component. In a further aspect, the predefined criteria is defined based on received analysis among the components. Upon satisfying the predefined criteria, the next version of the software component is released from the quarantine.

11 Claims, 8 Drawing Sheets

SCHEDULED AND QUARANTINED SOFTWARE DEPLOYMENT BASED ON DEPENDENCY ANALYSIS

BACKGROUND

Quality management procedures for software components are typically due before their deployment. The software components may be tested and validated, for example, to ensure a standard level of their quality. In a classical "on-premise" computer system environment, software components part of that environment and the components to be deployed, are assembled and tested altogether. In an "on-premise" environment, the software components and the hardware systems used to run these components are typically operated by a single entity or single owner, for example, a customer of the software provider. Thus, when software updates, new features, security enhancements, and so on, are offered by the software provider, the respective owner or customer has the flexibility to plan and implement unilaterally the deployment process of these updates or features. For example, the owner may create a test replica that resembles and corresponds to the "on-premise" computer system environment, in which test replica the offered software components are deployed, tested, and validated. After the components have been successfully tested and validated in the test environment, the owner may deploy them to the production system environment, which operates with actual business data. Therefore, the deployment process is planned, managed and organized by a single entity.

Unlike the "on-premise" environment, software components in a cloud computing environment are owned, developed, and operated by various entities or owners. Also, it is common that components developed by one entity may be reused by others, forming a network of interdependent components. Consequently, various components that are interconnected and dependent on each other may be managed by different entities. Furthermore, it is common that the number of dependencies among the components grows with significant rate with the number of components available in the cloud environment. Accordingly, in a cloud environment, it is unfeasible to organize a deployment process as in an "on-premise" environment, where new versions of software components are received, tested, validated, and rolled out at once and unilaterally by the respective owner. In the cloud environment, components are deployed ad hoc as dictated by the deployment requests of the different entities.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for scheduled and quarantined software deployment based on dependency analysis are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
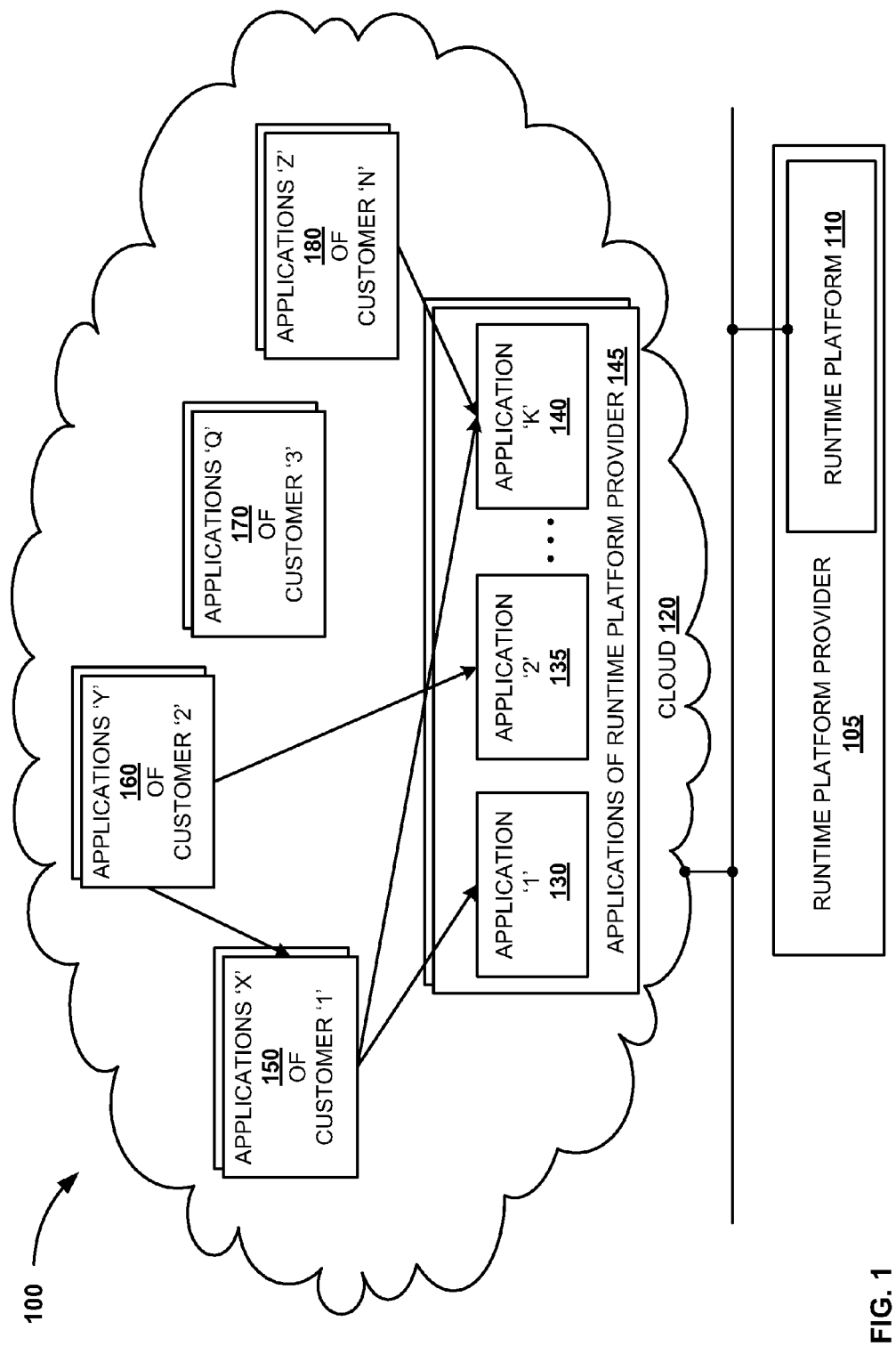
FIG. 1 is a block diagram illustrating an exemplary computer system landscape with applications deployed onto a cloud infrastructure, according to one embodiment.

FIG. 1 is a block diagram illustrating an exemplary computer system landscape 100 with applications deployed onto a cloud infrastructure, according to one embodiment. A runtime platform 110 may be a cloud infrastructure. A cloud infrastructure or cloud environment may refer to the collection of hardware and software that enables essential characteristics of cloud computing. The cloud infrastructure can be viewed as containing both a physical layer and an abstraction layer. The physical layer may consist of the hardware resources that are necessary to support the cloud services being provided, and typically may include server, storage, network components, etc. In one embodiment, the hardware resources may be owned, managed and operated by a platform provider, a third party, or some combination of them. The abstraction layer may consist of the software deployed across the physical layer, which manifests the essential cloud characteristics. Conceptually the abstraction layer is above the physical layer.

In one embodiment, runtime platform 110 may be a Platform-as-a-Service (PaaS). As such, runtime platform 110 may exhibit typical properties of a cloud infrastructure such as resource pooling where the computing resources of the cloud infrastructure provider are pooled to serve multiple consumers using a multi-tenant model. Another characteristic that runtime platform 110 may exhibit is elasticity that refers to the capability of the platform to elastically provision and release computing resources to scale commensurate with demand. Runtime platform 110 may also expose a metering characteristic. Metering may refer to the capability of the cloud infrastructure to automatically control, monitor, report and optimize resource usage at some level of abstraction appropriate to the type of service. Such level of abstraction may be, for example, storage, processing, bandwidth, and active user accounts, etc. Further, capabilities of the runtime platform 110 are available over the network and accessible through standard mechanisms by heterogeneous thin or thick client platforms (e.g., mobile phones, tablets, laptops, and workstations). Other capabilities of runtime platform 110 may include Hypertext Transfer Protocol (HTTP) load balancing, clustering, Domain Name System (DNS) as a cloud service, etc.

Runtime platform 110 may be developed, operated and maintained by a runtime platform provider 105. There are a number of vendors that provide commercial runtime platforms. Just as an example, SAP AG provides SAP NetWeaver® Cloud, a Java® based Platform-as-a-Service offering that makes it possible for partners and customers of SAP AG to deploy and use Java® applications in a cloud environment. Examples of other vendors of runtime platforms for applications in a cloud environment include, but are not limited to, Google Inc. that provides Google App Engine™ platform, Salesforce.com that provides Heroku™ platform, VMware Inc. that provides Cloud Foundry™ platform, Microsoft Corporation that provides Windows Azure™ platform. In one embodiment, runtime platform 110 may include application server as a core part for building runtime environment based on the runtime platform 110. For example, the application server may be a Java® application server for executing Java® based applications. In another example, the application server may be a webserver to provide environment for execution of web based applications. Further, runtime platform 110 may also include an operating system and a database.

Customers, partners, or other consumers of runtime platform 110 may create, develop, and customize applications or other software components based on runtime platform 110. As illustrated in FIG. 1, applications 'X' 150 of customer '1', applications 'Y' 160 of customer '2', applications 'Q' 170 of customer '3', and applications 'Z' 180 of customer 'N', are built based on runtime platform 110. In one embodiment, runtime platform provider 105 may also create one or more applications built on runtime platform 110 and offer the applications, in addition to the runtime platform 110, to customers. For example, applications 145 are developed, managed, and owned by runtime platform provider 105.

Typically, in cloud environment, applications or other software components are provided and delivered for deployment and the cloud infrastructure automatically performs the deployment of the applications. Once deployed, the applications are available for use and can be consumed. For example, applications 'X' 150, applications 'Y' 160, applications 'Q' 170, applications 'Z' 180, and applications 145 of runtime platform provider 105, are deployed and installed on cloud 120 and may be accessed and consumed, for example, via the Internet.

The availability of various applications in cloud 120 may support software reusability among providers and consumers of the software. Thus, in cloud 120, various connections, relationships and dependencies may be formed between the applications. For example, software components deployed on cloud 120 are dependent on runtime platform 110 that is managed by the runtime platform provider 105. Also, as illustrated in FIG. 1, one or more of applications 'X' 150 may depend on or refer to one or more applications 145 such as application 'I' 130 and application 'K' 140. Further, one or more of applications 'Y' 160 depend on application '2' 135 and one or more of applications 'X' 150. Also, one or more of applications 'Z' 180 depend on application 'K' 140. Just as an example, application 'K' 140 of runtime platform provider 105 may be a customer relationship management (CRM) system. Runtime platform provider 105 may install and operate the CRM system in cloud 120 where various customers may procure the CRM system and offer the system to their associated consumers. For example, customer '1' and customer 'N' may access and use the CRM system in exchange for a subscription fee such as a monthly fee or an annual fee, or other form of billing such as billing based on business transactions or volume of usage. In turn, customer '1' may offer and deliver another application that depends on application 'K' 140, for example, an application from applications 'X' 150 for credit cards validation. Similarly, customer '2' may also offer an application from applications 'Y' 160 that depends on or refers to an application from applications 'X' 150.

On one hand, dependencies, relationships and connections may be formed among applications and other software components deployed on cloud 120. On the other hand, the software components are owned, developed, and operated by various entities or owners, e.g., customer '1', customer '2', customer '3', and customer 'N', and runtime platform provider 105. In case an update or another change of one or more applications is deployed and introduced by one or more owners, other software components in cloud 120 may be affected. It is possible that a major change of an application is delivered, for example, a new release of a CRM system. Such major change may significantly impact components that depend on the updated application. Thus, it may be desirable that the deployment of such major change can be planned and organized by the affected parties.

On the other hand, it may also be common that the various owners and providers of software components in cloud 120 frequently deliver and release updates, bug fixes, minor improvements or other changes of the respective software components. In such case, an automatic deployment may be desirable for numerous minor improvements that are backward compatible.

It is possible that software deployment requests are received randomly as determined by the numerous entities. Furthermore, the number of dependencies among the software components in cloud 120 may grow with significant rate with the number of components available and introduced in cloud 120. Therefore, software deployment process in cloud 120 can be unorganized, unplanned and difficult to track. It is also possible that defective components and components that produce correct results are deployed to cloud 120 simultaneously and at the same time. Components in cloud 120 that depend on the defective components may be negatively impacted by affecting their proper working as well. It may be inefficient, cumbersome or unfeasible to determine and isolate the source of the errors. In one embodiment, an automatic software deployment process is implemented where deployment of software components is scheduled or planned. Further, components are kept under quarantine until a predefined criteria is satisfied. For the period of the quarantine components may be monitored and tested.

Figure 2:
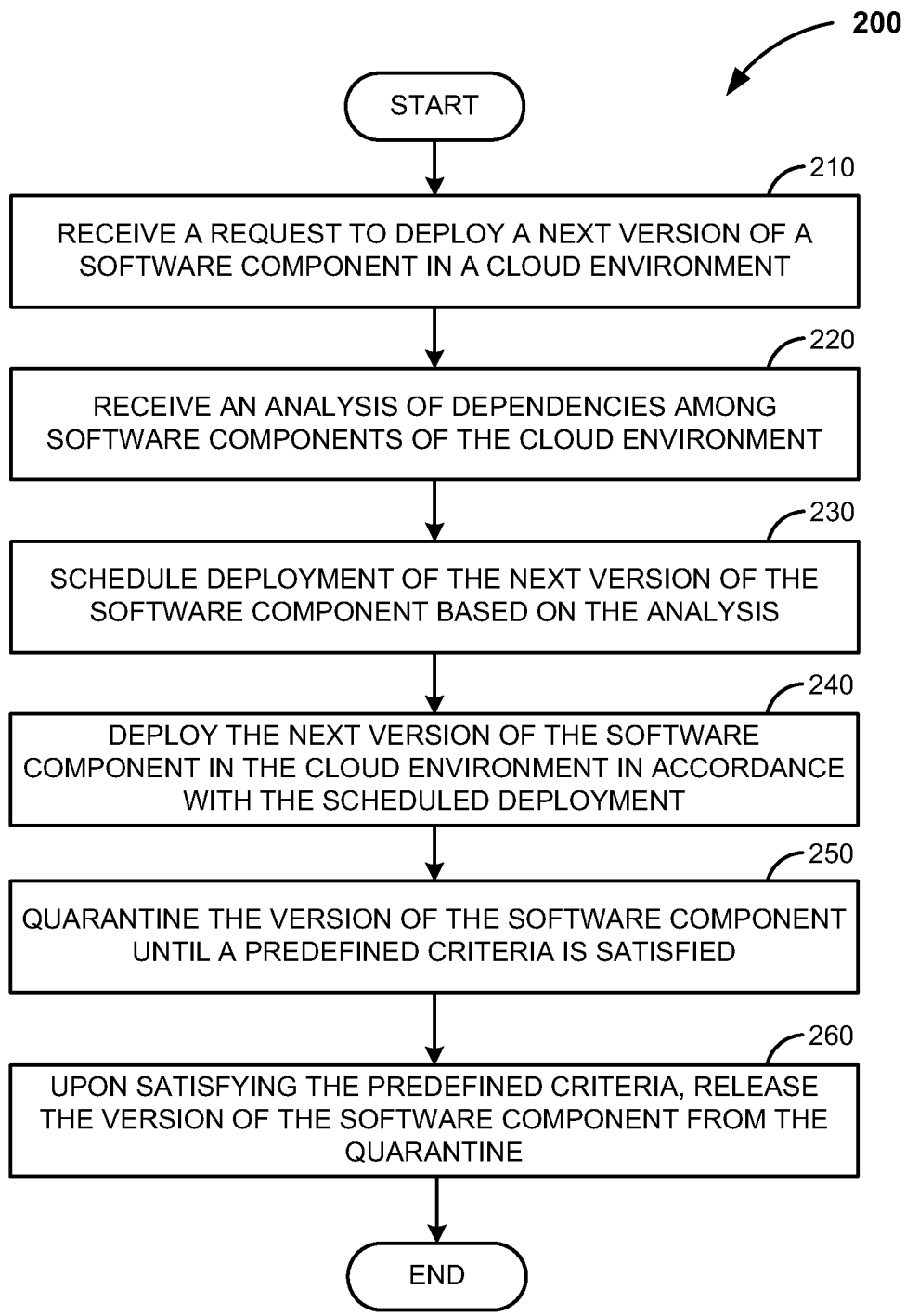
FIG. 2 is a flow diagram illustrating a scheduled and quarantined software deployment process in a cloud environment, according to one embodiment.

FIG. 2 illustrates a scheduled and quarantined software deployment process 200 in a cloud environment, according to one embodiment. At 210, a request to deploy a next version of a software component in a cloud environment from a number of software components of the cloud environment is received. In one embodiment, the next version of the software component may be a minor improvement, a bug fix, an update, a new implementation of the software component, or any other change of the currently deployed software component. In one embodiment, the next version may be a backward compatible change of a current version of the software component. It is possible also that the next version of the software component has been previously deployed in the cloud environment. For example, a request to deploy an old version again may be received, e.g., to roll back to a previous state of the component.

At 220, an analysis of a number of dependencies among the number of software components of the cloud environment is received. In one embodiment, a graph that represents the dependencies among the software components is constructed, where one software component references, depends on, or is otherwise associated with another software component. In one embodiment, the dependencies among the software components in the cloud environment may be explicitly declared. Just as an example, the dependencies may be explicitly declared through "import" or "export" statements. In another embodiment, the dependencies may also be determined based on data related to requests or other form of communication between the software components. To illustrate, it is typical that software components in the cloud environment communicate by standard means such as HTTP requests and responses that may be inspected, monitored and detected by the cloud infrastructure. If component 'A' sends a request to component 'B', this may be evidence that component 'A' depends on component 'B'. The infrastructure to intercept, monitor, and gather data related to the communication between the software components is typically part of standard cloud infrastructures, e.g., for the purposes of security, resource metering, etc. Based on the gathered communication data, dependencies among the software components are analyzed. An example process to construct an analysis of a number of dependencies among a number of software components of a cloud environment is illustrated in relation to FIG. 3.

At 230, deployment of the next version of the software component is scheduled based on the received analysis. In one embodiment, deployment requests may be frequently and concurrently sent. Thus, numerous deployment requests may be processed at the same time. To schedule the deployment of the next version of the software component, it is determined if there are deployment requests that are currently processed. And also it is determined if the request to deploy the next version of the software component may overlap with the currently processed requests. Overlapping deployment requests are such requests, where once the respective deployments are completed a common set of components may be affected. Based on the dependency analysis, it is determined whether the currently processed deployment requests overlap with the deployment request of the next version. If there are overlapping requests, the deployment of the next version of the software component is postponed until such requests are processed. Thus, the deployment process is automatically scheduled, planned, and organized. In one embodiment, scheduling and separating the deployment processes of software components may facilitate identification of those software components that may produce errors. For example, when comparing the behavior of the software component before and after the next version is deployed, it is possible to exclude other deployed and updated components as the sources or originators of the errors. An example process to schedule the deployment of the next version of the software component is illustrated in relation to FIG. 5.

At 240, the next version of the software component is deployed in the cloud environment in accordance with the scheduled deployment. Based on the determined order of deployment in the schedule, the next version of the software component is deployed so that it can be invoked, accessed, used, and is generally available in the cloud environment. Once deployed, the next version of the software component is quarantined until a predefined criteria is satisfied at 250. Although the next version of the component is deployed and available to be used and accessed, it may be kept in isolation and not fully utilized, e.g., for a predefined period of time or until predefined conditions are satisfied. During the period of the quarantine, the next version of the software component and the set of components affected by the deployment of the next version may be monitored, tested, and evaluated.

In one embodiment, the current version of the component and the next version of the component may be running and available for use in the cloud environment concurrently for the period of the quarantine. Thus, during the quarantine, the next version of the software component does not fully replace the current version of the component. For example, a portion of requests sent to the software component may be routed through the next version of the software component and another portion of the incoming requests may be routed through the current version of the software component. Thus, during the period of the quarantine, the behavior of the next version of the component may be compared to the behavior of the current version of the software component. Scheduling and quarantining help to analyze whether the deployment operation of the next version of the software component may be related to errors occurring in the cloud environment.

At 260, the next version of the software component is released from the quarantine upon satisfying the predefined criteria. In one embodiment, the next version of the software component replaces the current version of the component if during the quarantine it is determined that the next version works properly and as expected. Thus, all incoming requests directed to the software component are routed through and processed by the next version of the component.

There are various criteria that may be defined to automatically release a component from quarantine or, alternatively, to withdraw and terminate the component from the cloud environment. In one embodiment, if the error rate of the next version of the software component is above a predefined threshold the next version may not be released from the quarantine. In such a case, the next version may remain inactive, may be rolled back or removed from the cloud environment. In another embodiment, the error rate of the current version of the software component may be compared with the error rate of the next version of the component. For example, if the error of the next version of the software component is no greater than the error rate of the current version of the component, then the next version may be released from the quarantine. Alternatively, upon determining that the difference between the error rate of the next version of the software component and the error rate of the current version of the software component is above a predefined threshold, the next version may not be released from the quarantine. In one embodiment, the criteria may be defined based on the received analysis related to the number of dependencies among the number of software components of the cloud environment. In yet another embodiment, a component may be manually released from quarantine or may be manually forced and kept under quarantine.

The difference in error rates between the current version and the next version of the software component may be only one of the factors based on which the criteria may be defined.

Another factor may be repetition of errors related to a customer or a software component itself. For example, if the next version of the software component generates errors related to a single customer, or significantly small number of customers, then the software component may work properly and the customer may be the source of the failures.

The deployment history related to a software component may be a factor in defining the criteria. For example, the number of failed deployment requests related to the same software component, the ratio between the error rate of the current version now (i.e. during the quarantine) and the current version in the past, etc. In one embodiment, if errors are related to significantly small number of customers, then the next version of software component may still be released from the quarantine. The business impact may be another factor that could be used to define the criteria.

In one embodiment, another factor in defining the criteria based on which the next version of the software component is released from the quarantine may be related to the type and content of the errors. For example, repetition of the same one or more errors, expectancy or probability of occurring errors, e.g., if produced errors are expected to be generated or not, generation of new, unseen, or distinct type of errors by the deployment of the next version of the software component are generated, etc. Such factors may be used to identify and analyze the source of the generated errors.

Figure 3:
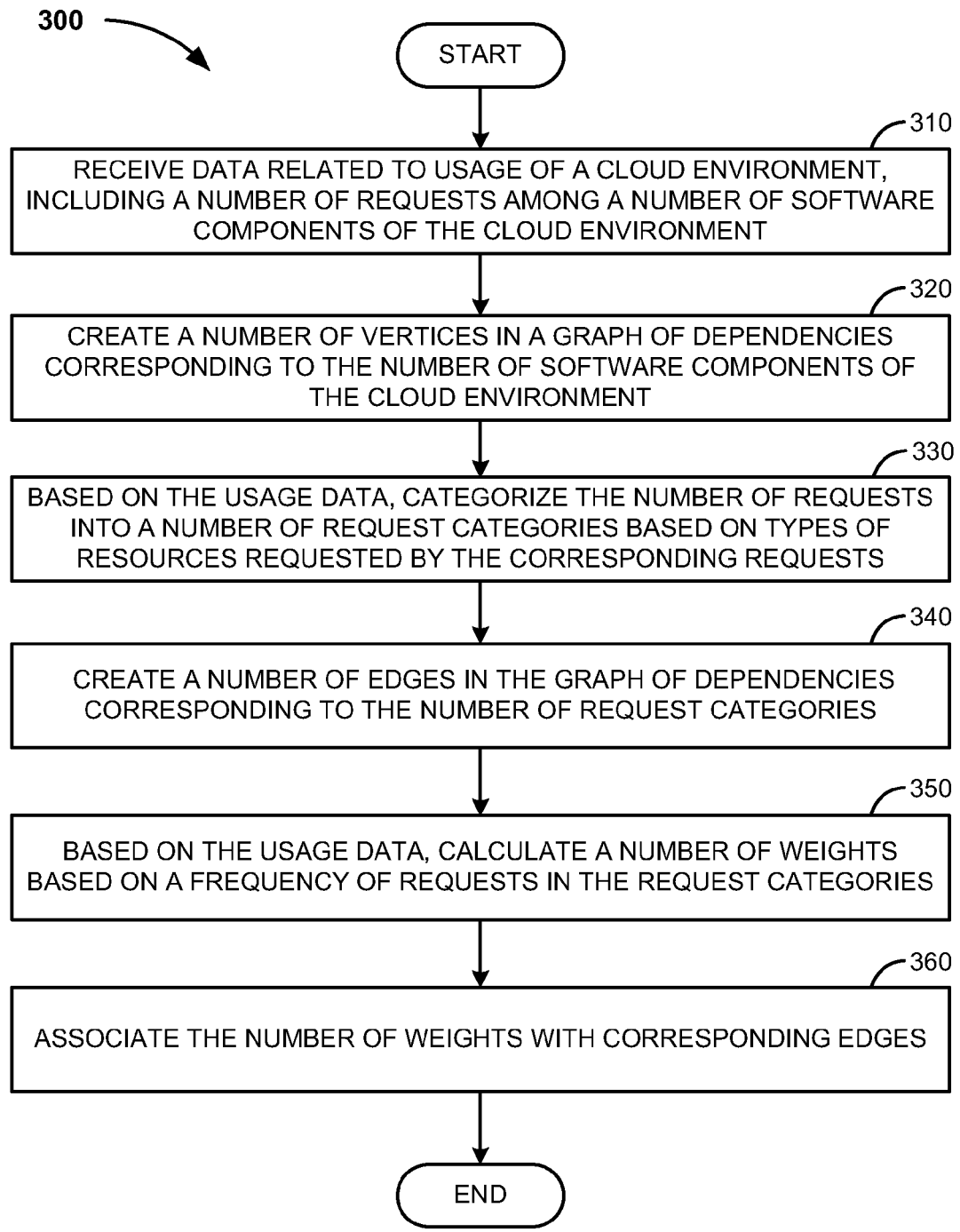
FIG. 3 is a flow diagram illustrating a process to construct an analysis of a number of dependencies among a number of software components of a cloud environment, according to one embodiment.

FIG. 3 illustrates an example process 300 to construct an analysis of a number of dependencies between a number of software components of a cloud environment, according to one embodiment. At 310, data related to usage of a cloud environment is received. The usage data may include a number of sent requests and responses among software components of the cloud environment. The usage data may include other data communicated or exchanged among the software components, e.g., other forms of messages or operations. In one embodiment, based on the usage data, dependencies between the components in the cloud environment are determined. For example, if component 'X' sends request to component 'Y', then component 'X' may depend on component 'Y'. In another embodiment, dependencies between components may be declared in and derived from metadata of the components.

In one embodiment, the analysis of the dependencies between the components of the cloud environment may be represented with a graph structure. At 320, a number of vertices in a graph of dependencies are created corresponding to the number of software components of the cloud environment. For example, for component 'X' a vertex 'X' is added to the graph of dependencies and for component 'Y', a vertex 'Y' is added, respectively.

At 330, based on the data related to the usage of the cloud environment, the requests are categorized into a number of request categories based on types of resources requested by the corresponding requests. For example, an HTTP request to "http://www.sap.netweavercloud.com/customers" may access resources of type "customers"; hence the request may be identified and categorized as a request of "customers" category. Similarly, request to access "http://www.sap.netweavercloud.com/products" may be categorized as a request of category "products".

A resource may be data that may be identified, referenced, and accessed, for example, by a Uniform Resource Locator (URL) or Uniform Resource Identifier (URI). There are various methods that may be used to categorize requests, for example, depending on the protocol used for communication between the software components. Examples of protocols that may be used for communication between the software components include, but are not limited to, Remote Procedure Call (RPC) protocol, Common Object Request Broker Architecture (CORBA) protocol, Remote Method Invocation (RMI), HTTP, Simple Object Access Protocol (SOAP). To illustrate a method that may be used to categorize requests, for web services based on SOAP, various Web Services Description Language (WSDL) operations may represent different request categories. In one embodiment, pattern recognition algorithms may be used to categorize requests, e.g., unsupervised machine learning algorithms may be applied to automatically discover the relevant categories. Thus, categorization may be based not only on the basis of single requests, but also on the basis of group of requests.

In one embodiment, a factor in defining the criteria based on which the next version of the software component is released from the quarantine may be related to categories of the requests. If errors are generated in relation to certain categories of the requests, this may facilitate the identification of the source of the errors. For example, identifying the type of resource that when requested produces errors.

At 340, a number of edges are created in the graph of dependencies that correspond to the number of request categories. In relation to the above-mentioned example, if component 'X' requests from component 'Y' resources of type "customers", then a directed edge from 'X' to 'Y' is created corresponding to request category "customers". Similarly, if component 'X' requests from component 'Y' resources of type "products", then another directed edge from 'X' to 'Y' is created request category "products".

At 350, based on the received usage data, a number of weights are calculated. The weights may be calculated based on a frequency of requests in the request categories. For example, if requests of category "customers" are sent once a minute and requests of category "products" are sent once a month, then respective weights may be proportionate to the frequency of requests. At 360, the weights are associated with corresponding edges. Thus, for example, edges from component 'X' to component 'Y' represent how intensively and frequently component 'X' requests respective resources from component 'Y', e.g., "products" or "customers". In one embodiment, the dependencies may be specified and weighted manually, for example, by providers of the software components.

In one embodiment, the graph may be constructed in response to received requests to deploy a software component in the cloud environment. In yet another embodiment, the graph may be constructed, stored in a memory location and updated periodically, for example, in accordance with predefined time intervals or depending on the received usage data. The graph may represent an analysis of dependencies between the software components. Based on such analysis, the impact of deployment operations that possibly introduce errors in the cloud environment may be forecasted and calculated.

Figure 4:
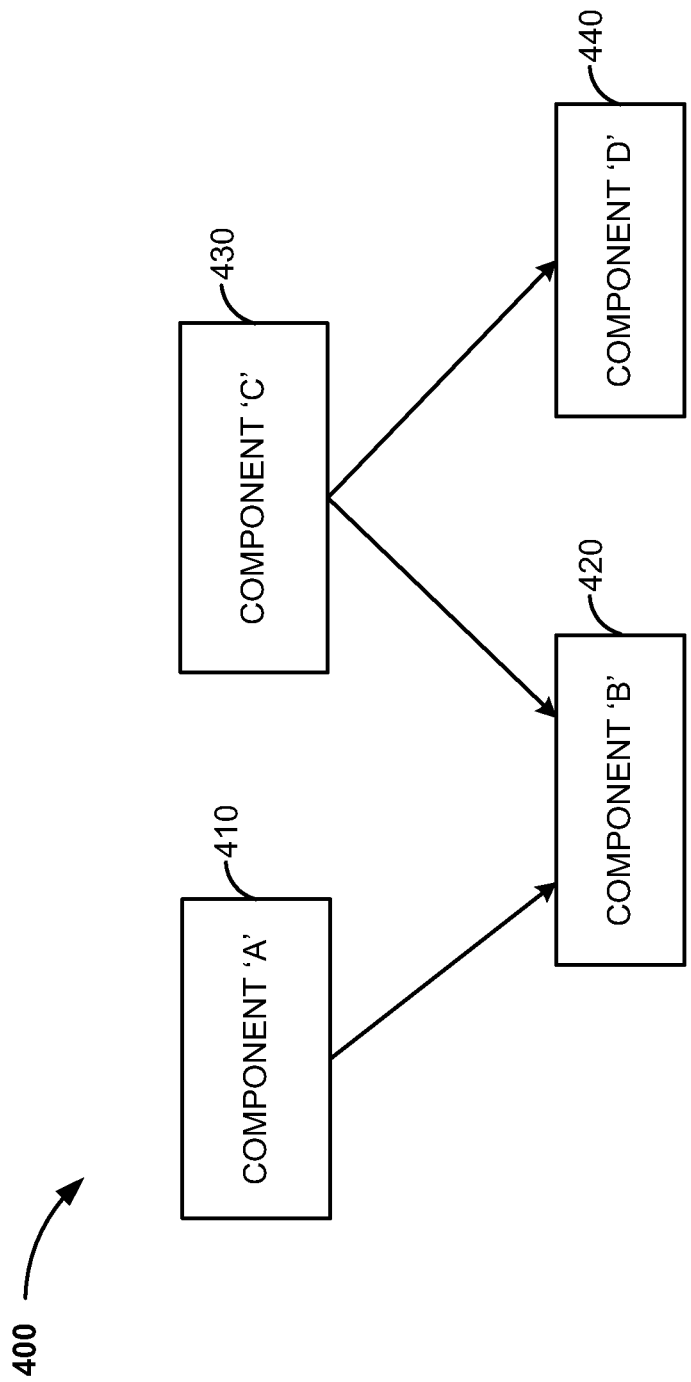
FIG. 4 is a block diagram illustrating an exemplary graph of dependencies among software components, according to one embodiment.

FIG. 4 illustrates an exemplary graph 400 of dependencies between software components, according to one embodiment. Graph 400 includes vertices corresponding to software components 'A' 410, 'B' 420, 'C' 430 and 'D' 440. Component 'A' 410 and component 'C' 430 depend on component 'B' 420. Component 'A' 410 and component 'C' 430 may request various resources from component 'B' 420. Thus, a deployment of a new version of component 'B' 420 may also affect components 'A' 410 and 'C' 430. Further, component 'C' depends on component 'D' 440. Graph 400 represents a simplified example of a dependency graph that may be generated in accordance with process 300. Graph 400 may also include multiple edges between components 'A' 410, 'B' 420, 'C' 430 and 'D' 440 depending on categories of requests between the components. Also weights may be associated with edges of graph 400, according to one embodiment.

Figure 5:
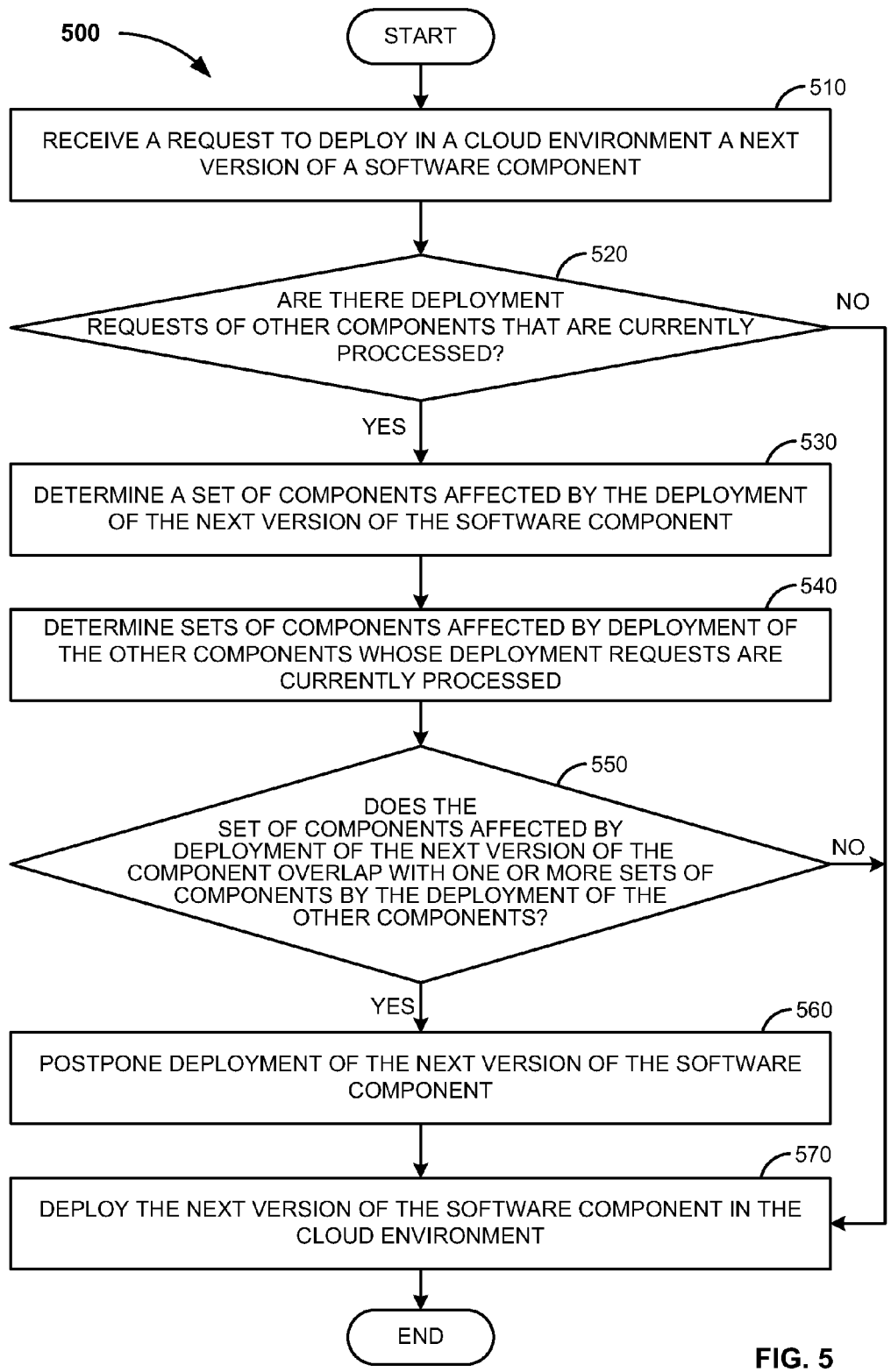
FIG. 5 is a flow diagram illustrating a process to schedule a deployment of a next version of a software component in a cloud environment, according to one embodiment.

FIG. 5 illustrates a process 500 to schedule a deployment of a next version of a software component in a cloud environment, according to one embodiment. At 510, a request to deploy in a cloud environment a next version of a software component is received. At 520, it is determined whether there are deployment requests of other components in the cloud environment that are currently processed. If there are no such requests, at 570, the next version of the software component is deployed in the cloud environment.

If it is determined that there are deployment requests for other components that are in process, a set of software components affected by the deployment of the next version of the software component is determined at 530. In one embodiment, components affected by the deployment of one component are components whose work may change as a result of the deployment of this one component. To illustrate with reference to FIG. 1, if a request to deploy a next version of application 'K' 140 is received, the set of components affected by the deployment of application 'K' 140 include application 'K' 140 itself, one or more of applications 'X' 150 and one or more of applications 'Z' 180 that may directly depend on application 'K' 140, and one or more applications 'Y' 160 that may indirectly depend on application 'K' 140. Applications 'Y' 160 are indirectly dependent on application 'K' if, for example, requests sent by applications 'Y' 160 to applications other than application 'K' (e.g., applications 'X' 450) in turn generate requests to application 'K'.

At 540, sets of components affected by deployment of the other components whose deployment requests are currently processed are determined. At 550, it is determined if the set of components affected by the deployment of the next version of the component and one or more sets of components affected by the currently processed deployment of the other components overlap. In mathematical terms, a first set of components affected by the deployment of a first component overlap with a second set of components affected by the deployment of a second component if the intersection of the first and the second set is not empty. To illustrate with reference to FIG. 4, a set of components affected by deployment of a next version of component 'B' 430 includes component 'B' itself and components 'A' 410 and 'C' 430, i.e. set '{A, B, C}', since components 'A' 410 and 'C' 430 depend on component 'B' 420. On the other hand, a set of components affected by deployment of a next version of component 'D' 440 includes component 'D' 440 itself and component 'C' 430 that depends on component 'D' 440, i.e. set '{C, D}'. The intersection of set '{A, B, C}' and set '{C, D}' is the set '{C}', which is not empty, hence, the set of components affected by deployment of a next version of component 'B' 420 and the set of components affected by deployment of a next version of component 'D' 440 overlap. In such a case, it is desirable that concurrent requests to deploy new versions of components 'B' 420 and 'D' 440 are not processed simultaneously. Otherwise, it may be more difficult to distinguish which component that is changed may have produced possible failures or errors. For example, if components 'B' 420 and 'D' 440 are simultaneously deployed and if an error occurs in component 'C' 430, it may be more difficult to analyze if the deployment of 'B' 420 or 'D' 440 may have caused the error compared to deploying components 'B' 420 and 'D' 440 one after the other.

If it is determined that the set of components affected by the deployment of the next version of the component and the one or more sets of components affected by the currently processed deployment of the other components does not overlap, at 570 the next version of the software component is deployed in the cloud environment.

Alternatively, if it is determined that the set of components affected by the deployment of the next version of the component and the one or more sets of components affected by the currently processed deployment of the other components overlap, at 560, deployment of the next version of the software component is postponed until the deployment of the another component is processed. Thus, the deployment of the next version of the software component may be postponed until overlapping requests are processed. To illustrate with reference to FIG. 4, if a deployment of component 'B' 420 is currently processed, a request to deploy component 'D' 440 is postponed until component 'B' 420 is deployed and released from the quarantine. Similarly, concurrent requests to deploy component 'A' 410 and component 'B' 420; component 'C' 430 and component 'B' 420; and component 'C' 430 and 'D' 440 are processed one after the other, since such concurrent requests are with overlapping sets of affected components. Alternatively, deployment of component 'A' 410 and component 'C' 430 may be processed at the same time, since the set of affected components of component 'A' 410 does not overlap with the set of affected components of component 'C' 430. Also, requests to deploy component 'A' 410 and component 'D' 440 may be processed simultaneously.

In one embodiment, two queues may be created in which queues software components are kept in the order of their processing. One may be a scheduler queue that stores or refers to components to be deployed, where the components are kept in the order of arrival of the respective deployment request. Another queue may be a quarantine queue that keeps or refers to components under quarantine. To illustrate with reference to FIG. 4, if a request to deploy component 'B' 420 is received, component 'B' 420 is added to the scheduler queue and components 'A' 410, 'B' 420, and 'C' 430 are added to the quarantine queue since components 'A' 410, 'B' 420, and 'C' 430 constitute the set of components affected by the deployment of component 'B' 420. If a request to deploy component 'D' 440 is received next, component 'D' 440 is next added to the scheduler queue and components 'C' 430 and 'D' 440 are added to the quarantine queue since components 'C' 430 and 'D' 440 constitute the set of components affected by the deployment of component 'D' 440. In accordance with process 500, the deployment of component 'D' 440 is postponed until component 'B' 430 is deployed and components 'A' 410, 'B' 420, and 'C' 430 are released from the quarantine. At 570, process 500 ends with deploying the next version of the software component in the cloud environment. The deployment is automatically, scheduled, planned, and organized.

Figure 6:
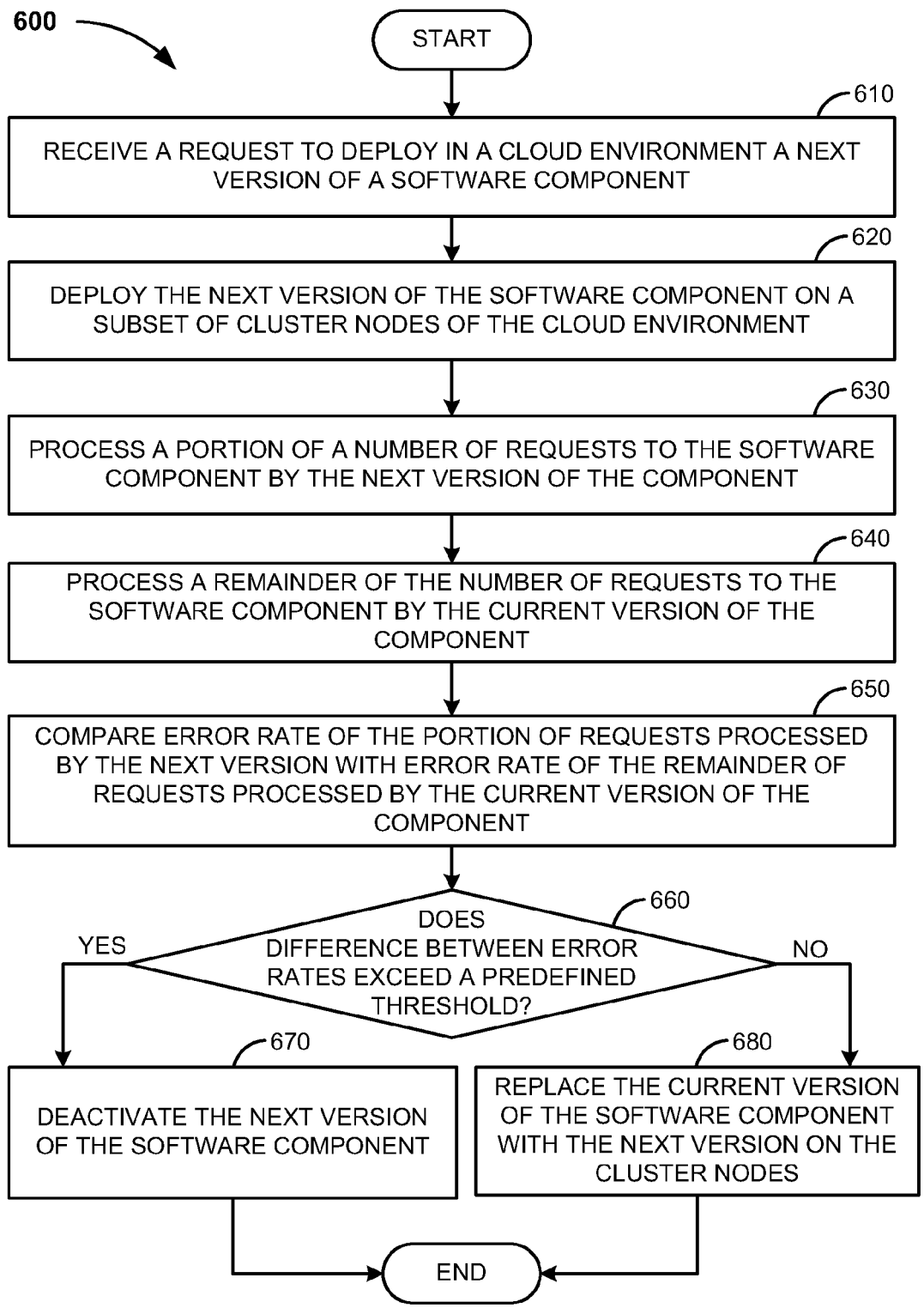
FIG. 6 is a flow diagram illustrating a process to quarantine a next version of a software component to be deployed in a cloud environment, according to one embodiment.

FIG. 6 illustrates process 600 to quarantine a next version of a software component to be deployed in a cloud environment, according to one embodiment. At 610, a request to deploy a next version of a software component in a cloud environment is received. In one embodiment, the software component may be deployed and installed on one or more than one cluster nodes, for example, virtual machines or application servers. The cluster nodes may share computational workload to provide better overall performance of the cloud environment. For example, requests to the software component may be processed by different cluster nodes. The cluster nodes on which the software component is installed may comprise one cluster.

At 620, the next version of the software component is deployed on a subset of cluster nodes of the cloud environment. Thus, on the subset of cluster nodes a current version of the software component is replaced with the next version of the software component. On the remaining subset of cluster nodes the current version is still running.

At 630, a portion of a number of requests to the software component is processed by the next version of the component. The portion of requests processed by the next version of the component are routed through and directed to the subset of cluster nodes on which the next version is deployed and installed. At 640, a remainder of the number of requests to the software component is processed by the current version of the component.

In one embodiment, incoming requests of a subset of users, customers or tenants of the software component may be directed to the subset of cluster nodes with the next version of the software component, while the rest of the users may be still served by the current version of the software component. For example, users whose requests are directed to the next version may be the ones with lowest service level agreement. In case the next version is defective, only a limited number of users may be affected. In one embodiment, splitting and routing incoming requests may be applied transitionally. To illustrate with reference to FIG. 1, if a version of application 'K' 140 is under a quarantine and a user 'U' related to customer '2' is selected to be served by the version of application 'K' 140 that is under quarantine. If user 'U' sends a request 'R1' to an application from applications 'X' 150, which request 'R1' in turn results in a request 'R2' application 'K' 140 under the quarantine. Then, as illustrated in FIG. 1, since the application from applications 'X' 150 depends on application 'K' 140, 'R2' may be transitionally directed to and processed by the version of application 'K' 140 that is under quarantine.

At 650, an error rate of the portion of requests processed by the next version of the software component is compared with an error rate of the remainder of requests processed by the current version of the component. At 660, it is determined whether the difference between the error rate of the portion of requests processed by the next version of the software component and the error rate of the remainder of requests processed by the current version of the component exceeds a predefined threshold.

At 670, the next version of the software component may be deactivated if the difference between the error rate of the next version of the component and the error rate of the current version of the component exceeds the predefined threshold. The next version may be rolled back and removed from the cloud. If the difference between the error rate of the next version of the component and the error rate of the current version of the component does not exceed the predefined threshold, the current version of the software component is replaced on the cluster nodes with the next version at 680. The current version of the software component is phased out and the incoming requests are processed by the next version of the software component.

In one embodiment, error rate of the set of components affected by the deployment of the next version of the software component before the quarantine of the next version may be compared to the error rate during the quarantine. Thus, not only the behavior of the updated software component, but also the behavior of the components affected by the update may be observed and analyzed.

Error rates or failures of the software component may be identified using various methods. On example is to identify and detect explicit error responses, e.g., HTTP error code 404 or 503. In another embodiment, content of responses to requests may be analyzed. Another possible approach to identify failures is based on users' feedback. For example, issue tracking system may be implemented in the cloud environment, where users explicitly report problems, complaints, errors, etc. Thus, it is possible to look for issues reported for a software component in the set of components affected by deployment of the software component under quarantine, where the reporter is served by the next version of the software component.

Keeping a software component under quarantine for a long period of time may be undesirable because, for example, other pending deployment requests may also be delayed. Further, customers and users may not be able to take advantage from the software component until the component is released from the quarantine. In one embodiment, the predefined criteria under which a component is released from, or respectively kept under, the quarantine may be defined based on the received analysis of the existing dependencies between the software components. For example, in one embodiment, upon successfully processing requests from the number of identified request categories by the next version of the software component, the next version of the software component may be released from the quarantine. Thus, if at least one request is processed from the identified request categories by the next version without detecting errors or anomalies, then the next version may be released from the quarantine.

In one embodiment, the next version of the software component may be released from quarantine upon successfully processing at least one request from each request category that is associated with the software component. In a further embodiment, the next version of the software component may be released from the quarantine upon successfully processing a predefined number of requests per request category by the next version. Thus, software components that process a higher number of requests may be released faster from the quarantine compared to component that process a lower number of requests. Highly loaded software component may quickly process required number of requests from the required request categories.

In one embodiment, request categories that occur rarely, for example once a month, may be disregarded and excluded from the criteria. For example, edges representing such categories may be removed from the graph of dependencies. Thus, keeping software components under the quarantine for an undesirable period of time may be avoided.

Quarantining software components affected by deployment of a next version of a software component, may facilitate the process of identifying errors that occur in relation to or are caused by the deployed next version. It may be compared if errors occur in the set of affected components before and after the deployment of the next version.

Figure 7:
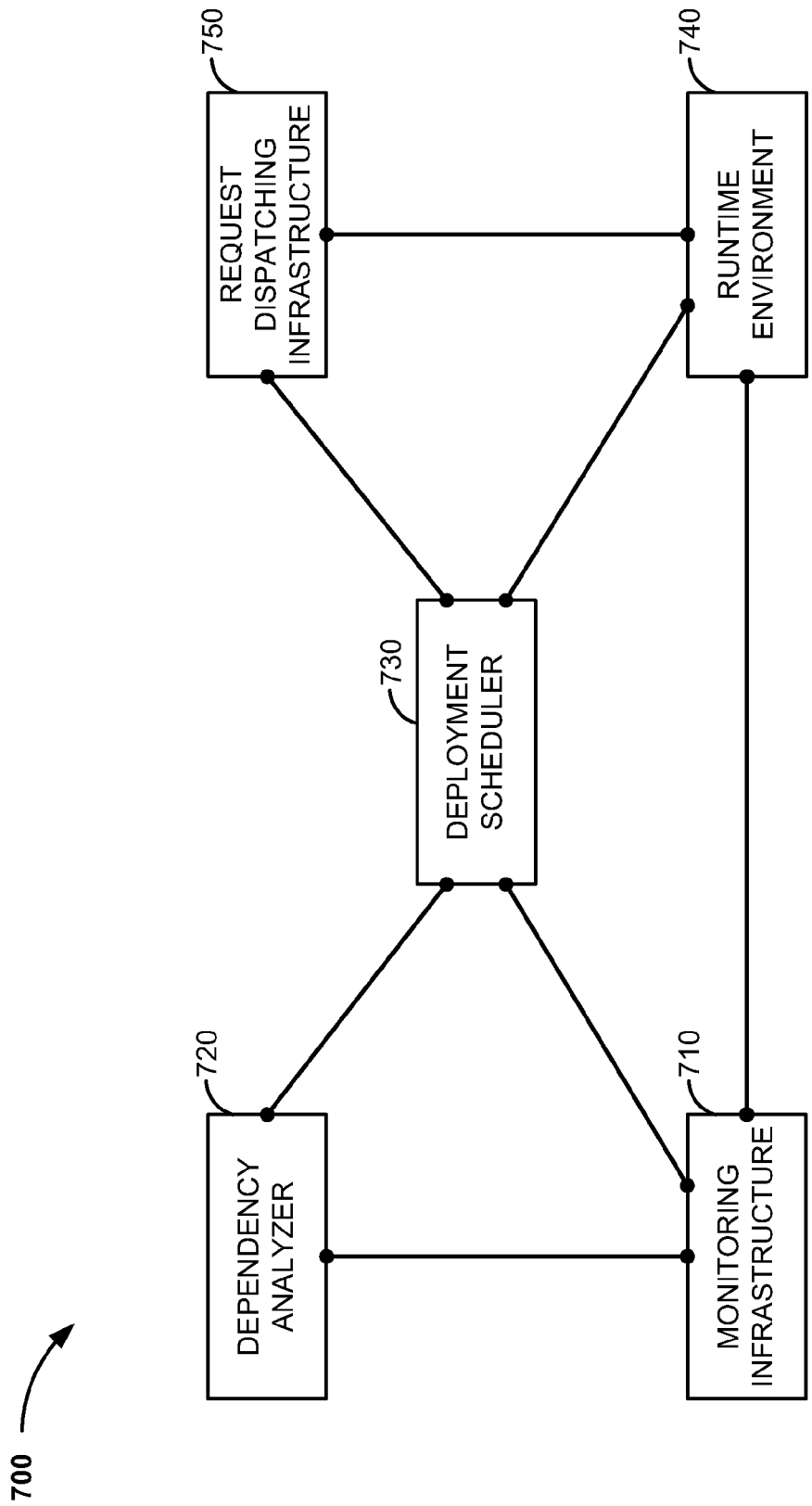
FIG. 7 is a block diagram illustrating exemplary computer system architecture for scheduled and quarantined software deployment in a cloud environment based on dependency analysis, according to one embodiment.

FIG. 7 illustrates exemplary computer system architecture 700 for scheduled and quarantined software deployment in a cloud environment based on dependency analysis, according to one embodiment. Monitoring infrastructure 710 to receive, monitor and intercept communication among the software components of the cloud environment. Monitoring infrastructure 710 tracks usage data of the cloud environment, for example, for billing, security, and other purposes. In one embodiment, the monitoring infrastructure 710 monitors exchanged HTTP requests and responses between software components. In one embodiment, usage or communication data may be gathered from runtime environment of the software components such as runtime environment 740 of a component whose next version is to be deployed. Runtime environment of components 740 may be a Java runtime environment such as Java EE. Usage or communication data may be gathered from runtime environments of software components in the cloud environment. For example, error log data of components other than the component whose next version is to be deployed may be relevant as well.

Based on the monitored and received usage data, dependency analyzer 720 generates a statistical analysis of a number of dependencies among the software components of the cloud environment. In one embodiment, dependency analyzer 720 generates a graph of dependency in accordance with process 300 illustrated in FIG. 3.

In one embodiment, upon receiving a request to deploy a next version of a software component, deployment scheduler 730 schedules the deployment of the next version of the software component based on the generated dependency analysis among components in the cloud environment. Deployment scheduler 730 may plan deployment operations in accordance with process 500 illustrated in FIG. 5. The next version of the software component is deployed in the cloud environment in accordance with the scheduled deployment.

Request dispatching infrastructure 750 dispatches incoming requests. In one embodiment, request dispatching infrastructure 750 may include a load balancer that is part of standard cloud infrastructures. The load balancer may manage workload by dispatching requests to cluster nodes with lower workload. Request dispatching infrastructure 750 may also include inbound and outbound request dispatcher that may direct HTTP request inside and outside the cloud environment, respectively.

In one embodiment, during the quarantine of the next version of the software component, a portion of incoming requests (e.g., 10%) to the software component is dispatched to the next version of the software component by request dispatching infrastructure 750. Another portion of incoming requests to the component (e.g., 90%) is dispatched to the current version of the software component by request dispatching infrastructure 750.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 8:
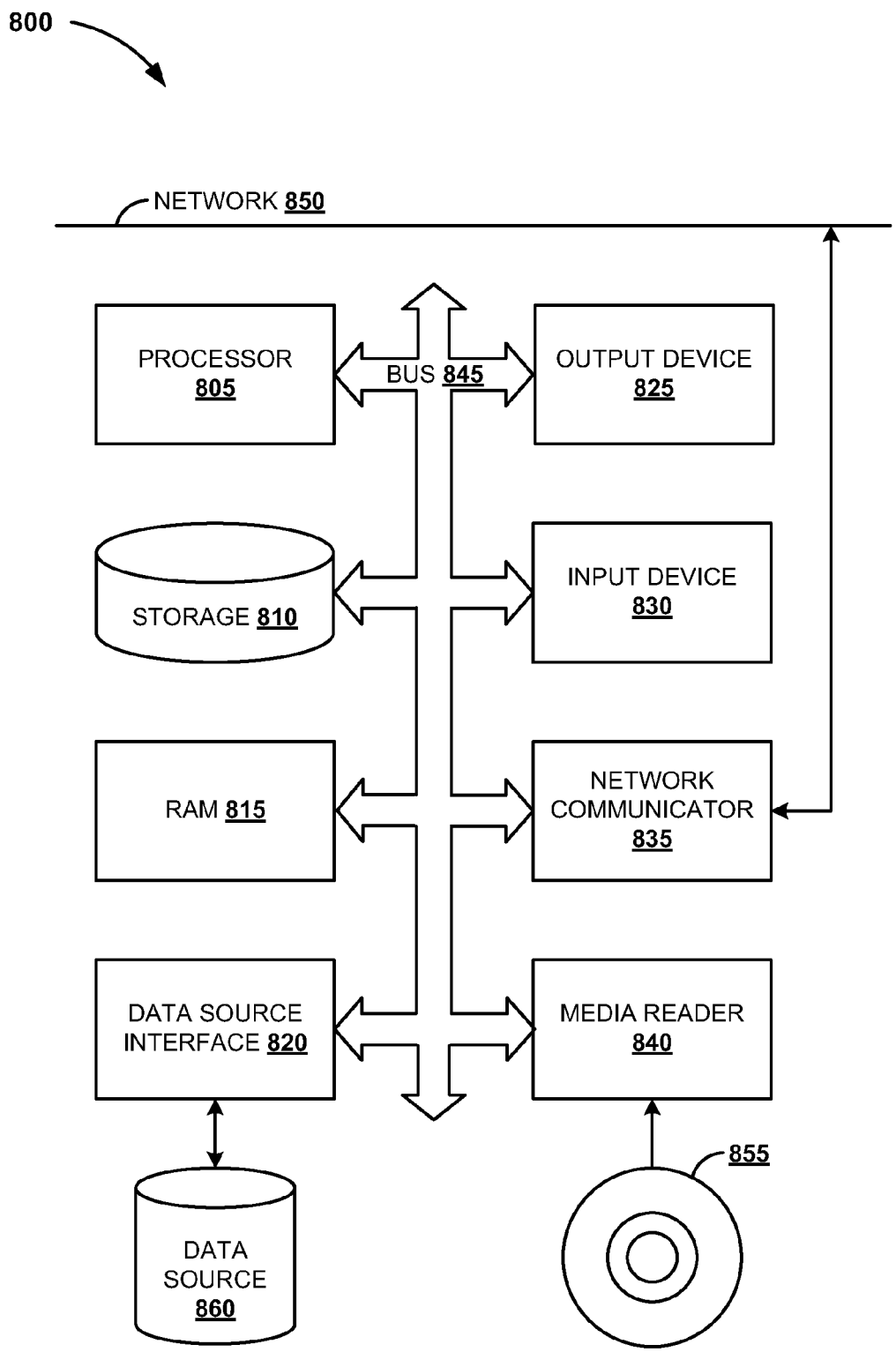
FIG. 8 is a block diagram illustrating an exemplary computer system to execute computer readable instructions related to scheduled and quarantined software deployment based on dependency analysis, according to one embodiment.

FIG. 8 is a block diagram of an exemplary computer system 800. The computer system 800 includes a processor 805 that executes software instructions or code stored on a computer readable storage medium 855 to perform the above-illustrated methods of the invention. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. The stored instructions may be further compiled to generate other representations of the instructions and dynamically stored in the RAM 815. The processor 805 reads instructions from the RAM X15 and performs actions as instructed. According to one embodiment of the invention, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Each of these output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer implemented method to automatically deploy a next version of a software component from a plurality of software components in a cloud environment, the method comprising:
    receiving, at a computer, a request to deploy the next version of the software component in the cloud environment;
    receiving, at the computer, a dependency analysis of a plurality of dependencies among the plurality of software components of the cloud environment, wherein receiving the dependency analysis further comprises:
        receiving data related to the requests for communication among the plurality of software components;
        based on the received data, categorizing the requests into a plurality of request categories based on types of resources requested by the corresponding requests; and
        determining frequency of requests by the request categories among the plurality of software components;
    the computer, postponing a deployment of the next version of the software component based on the dependency analysis until a currently processed deployment of another software component is processed when a first set of affected software components affected by deployment of the next version of the software component overlaps with a second set of affected software components affected by the currently processed deployment of the another software component;
    deploying, from the computer, the next version of the software component in the cloud environment in accordance with the scheduled deployment;
    the computer, quarantining the next version of the software component until a predefined criteria is satisfied;
    comparing an error rate of responses generated by a current version of the software component with the error rate of responses generated by the next version of the software component; and
    releasing the next version of the software component from the quarantine upon determining that a difference between the error rate of the next version of the software component and the error rate of the current version software component is below a predefined threshold.

2. The method of claim 1, wherein quarantining the next version of the software component further comprises:
    running a current version of the software component and the next version of the software component concurrently until the next version is released from the quarantine, and
    processing a portion of a plurality of requests to the software component by the next version of the software component.

3. The method of claim 1 further comprising:
    upon satisfying the predefined criteria, releasing the version of the software component from the quarantine.

4. The method of claim 1 further comprising:
    upon successfully processing requests from the plurality of request categories by the next version of the software component, releasing the next version of the software component from the quarantine.

5. A computer system to automatically deploy in a cloud infrastructure a next version of a software component from a plurality of software components of the cloud infrastructure, the system including:
    at least one processor and memory to execute program code, which when executed cause the computer to perform operations comprising:
    receiving a plurality of requests between the plurality of software components, wherein based on the received plurality of requests an analysis of a plurality of dependencies among the plurality of software components of the cloud infrastructure is generated, wherein the analysis of the plurality of dependencies further comprises:
        receiving data related to the requests for communication among the plurality of software components;
        based on the received data, categorizing the requests into a plurality of request categories based on types of resources requested by the corresponding requests; and
        determining frequency of requests by the request categories among the plurality of software components;
    postponing deployment of the next version of the software component based on the received analysis until a currently processed deployment of another software component is processed when a first set of affected software components affected by deployment of the next version of the software component overlaps with a second set of affected software components affected by the currently processed deployment of the another software component;
    deploying the next version of the software component onto the cloud infrastructure in accordance with the scheduled deployment;
    quarantining the next version of the software component until a predefined criteria is satisfied;

comparing an error rate of responses generated by a current version of the software component with the error rate of responses generated by the next version of the software component; and releasing the next version of the software component from the quarantine upon determining that a difference between the error rate of the next version of the software component and the error rate of the current version software component is below a predefined threshold.

6. The system of claim 5, wherein the operations further comprising:

dispatching a portion of a plurality of requests to the software component to the next version of the software component.

7. The system of claim 5, wherein the operations further comprising:

upon satisfying a predefined criteria, releasing the next version of the software component from the quarantine, and dispatching incoming requests to the software component to the next version of the software component.

8. The system of claim 5, wherein the operations comprising:

upon successfully processing requests from the plurality of request categories by the next version of the software component, releasing the next version of the software component from the quarantine.

9. A non-transitory computer readable medium storing instructions thereon, which when executed by a processor cause a computer system to:

receive a request to deploy a next version of the software component from a plurality of software components in a cloud environment;

receive a dependency analysis of a plurality of dependencies among the plurality of software components of the cloud environment, wherein the dependency analysis is generated by:

receiving data related to a plurality of requests between the software components;

based on the received data, categorizing the plurality of requests into a plurality of request categories based on types of resources requested by the corresponding plurality of requests; and determining frequency of requests by the request categories among the plurality of software components;

postpone deployment of the next version of the software component based on the dependency analysis until a currently processed deployment of another software component is processed when a first set of affected software components affected by deployment of the next version of the software component overlaps with a second set of affected software components affected by the currently processed deployment of the another software component;

deploy the next version of the software component in the cloud environment in accordance with the scheduled deployment;

quarantine the next version of the software component until a predefined criteria is satisfied;

comparing an error rate of responses generated by a current version of the software component with the error rate of responses generated by the next version of the software component; and releasing the next version of the software component from the quarantine upon determining that a difference between the error rate of the next version of the software component and the error rate of the current version software component is below a predefined threshold.

10. The computer readable medium of claim 9, wherein quarantining the next version of the software component further comprises:

running a current version of the software component and the next version of the software component concurrently until the next version is released from the quarantine, and processing a portion of a plurality of requests to the software component by the next version of the software component.

11. The computer readable medium of claim 9 further comprising:

upon satisfying the predefined criteria, releasing the version of the software component from the quarantine.

* * * * *